United States Patent
Trapp et al.

(10) Patent No.: US 9,969,343 B2
(45) Date of Patent: May 15, 2018

(54) METHODS AND SYSTEMS FOR MANAGING AN ELECTRICAL CONNECTION BETWEEN A POWER REGULATING DEVICE AND AN ENERGY STORAGE DEVICE INCLUDED IN A VEHICLE

(71) Applicant: Robert Bosch GmbH, Stuttgart (DE)

(72) Inventors: Spencer Trapp, Brighton, MI (US); Gunther Lang, Stuttgart (DE); Krishnadev Kumar, Kamataka (IN)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 14/929,772

(22) Filed: Nov. 2, 2015

(65) Prior Publication Data

US 2017/0021789 A1 Jan. 26, 2017

(30) Foreign Application Priority Data

Jul. 24, 2015 (IN) .............................. 815/KOL/2015

(51) Int. Cl.
| | |
|---|---|
| *H02H 7/18* | (2006.01) |
| *B60R 21/01* | (2006.01) |
| *B60L 3/04* | (2006.01) |

(52) U.S. Cl.
CPC ................ *B60R 21/01* (2013.01); *B60L 3/04* (2013.01); *B60L 2240/14* (2013.01);
(Continued)

(58) Field of Classification Search
CPC ......... B60R 21/01; B60L 3/04; B60L 2240/14
See application file for complete search history.

(56) References Cited

U.S. PATENT DOCUMENTS

| 5,389,824 A | 2/1995 | Moroto et al. |
| 5,816,358 A * | 10/1998 | Adler ..................... B60K 28/14 |
| | | 180/279 |

(Continued)

FOREIGN PATENT DOCUMENTS

| DE | 102011082296 | 3/2013 |
| DE | 102012214368 | 2/2014 |
| JP | 2014147205 | 8/2014 |

OTHER PUBLICATIONS

International Search Report and Written Opinion for Application No. PCT/EP2016/065456 dated Sep. 15, 2016 (12 pages).

*Primary Examiner* — Alfonso Perez Borroto
(74) *Attorney, Agent, or Firm* — Michael Best & Friedrich LLP (57) ABSTRACT

Methods and systems for managing an electrical connection between a power regulating device included in a vehicle and an energy storage device included in the vehicle. One system includes an electronic processor configured to compare a first acceleration of the vehicle to a first threshold and generate a first output representing whether the first acceleration exceeds the first threshold. The electronic processor is also configured to compare a second acceleration of the vehicle to a second threshold and generate a second output representing whether the second acceleration exceeds the second threshold. The electronic processor is further configured to output a signal to disconnect the power regulating device from at least one energy storage device include in the vehicle when the first output represents that the first acceleration exceeds the first threshold and the second output represents that the second acceleration exceeds the second threshold.

20 Claims, 9 Drawing Sheets

(52) U.S. Cl.
CPC ....... *B60L 2240/16* (2013.01); *B60L 2240/18* (2013.01); *B60R 2021/01013* (2013.01)

(56) References Cited

U.S. PATENT DOCUMENTS

| | | |
|---|---|---|
| 7,339,774 B2 | 3/2008 | Zdziech et al. |
| 2006/0025912 A1* | 2/2006 | Haering ............ B60R 21/01336 701/45 |
| 2006/0038387 A1 | 2/2006 | Haering et al. |
| 2006/0137929 A1* | 6/2006 | Yoshida .................. B60K 6/48 180/279 |
| 2011/0304202 A1 | 12/2011 | TenHouten et al. |
| 2013/0295419 A1 | 11/2013 | Kwon et al. |
| 2015/0175002 A1 | 6/2015 | Lee |
| 2015/0191087 A1 | 7/2015 | Uchida |

* cited by examiner

METHODS AND SYSTEMS FOR MANAGING AN ELECTRICAL CONNECTION BETWEEN A POWER REGULATING DEVICE AND AN ENERGY STORAGE DEVICE INCLUDED IN A VEHICLE

RELATED APPLICATIONS

This application claims priority to Indian Patent Application No. 815/KOL/2015 filed Jul. 24, 2015, the entire content of which is incorporated by reference herein.

FIELD

Embodiments of the invention relate to methods and systems of managing electrical connections between an energy storage device, such as a battery, and a power source, such as a power regulating device, included in a vehicle.

BACKGROUND

In some vehicular situations, providing power to or receiving power from an energy storage device can be dangerous. For example, during an accident (i.e., during and after vehicle impact), an energy storage device may not be needed and may present a risk of electrical shock or damage (e.g., fire, explosion, etc.). However, disconnecting an energy storage device from a power source must be selectively performed to ensure that a disconnection is truly warranted (e.g., given the severity of the accident).

SUMMARY

Accordingly, embodiments of the invention provide methods and systems for managing an electrical connection between a power regulating device (e.g., a battery charger) included in a vehicle and an energy storage device (e.g., a battery) also included in the vehicle. One embodiment includes an electronic processor configured to terminate the electrical connection between the power regulating device and the battery (i.e., cut-off or disconnect the electrical connection) in response to vehicle impact. To determine whether vehicle impact has occurred that warrants termination of the electrical connection, the electronic processor evaluate signals (e.g., vehicle crash signals) transmitted by one or more components included in the vehicle (e.g., over a vehicle communication bus) to determine a severity of the impact. In some embodiments, the signals represent acceleration values for the vehicles and the electronic processor is configured to compare the acceleration values to a plurality of thresholds. If the acceleration values exceed the plurality of thresholds, the electronic processor disconnects (e.g., terminates the electrical connection) between the power regulating device and the energy storage device.

For example, one embodiment of the invention provides a system for managing an electrical connection between a power regulating device included in a vehicle and an energy storage device included in the vehicle. The system includes an electronic processor configured to compare a first acceleration of the vehicle to a first threshold and generate a first output representing whether the first acceleration of the vehicle exceeds the first threshold. The electronic processor is also configured to compare a second acceleration of the vehicle to a second threshold and generate a second output representing whether the second acceleration of the vehicle exceeds the second threshold. The electronic processor is further configured to output a signal to disconnect the power regulating device from at least one energy storage device included in the vehicle when the first output represents that the first acceleration of the vehicle exceeds the first threshold and the second output represents that the second acceleration of the vehicle exceeds the second threshold. The signal terminates the electrical connection between the power regulating device and the energy storage device.

Another embodiment of the invention provides a method of managing an electrical connection between a power regulating device included in a vehicle and an energy storage device included in the vehicle. The method includes detecting a first acceleration of the vehicle, comparing the first acceleration of the vehicle to a first threshold, and generating a first output representing whether the first acceleration of the vehicle exceeds the first threshold. The method also includes detecting a second acceleration of the vehicle, comparing the second acceleration of the vehicle to a second threshold, and generating a second output representing whether the second acceleration of the vehicle exceeds the second threshold. The method further includes outputting, with an electronic processor, a signal when the first output represents that the first acceleration of the vehicle exceeds the first threshold and the second output represents that the second acceleration of the vehicle exceeds the second threshold. The signal terminates the electrical connection between the power regulating device and the energy storage device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
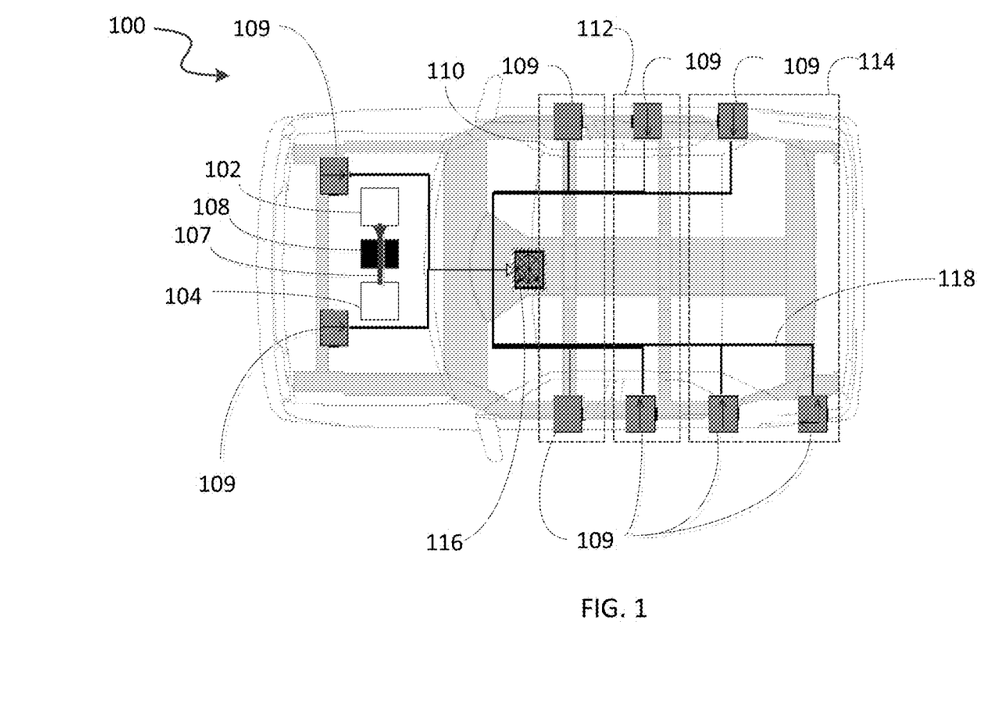
FIG. 1 schematically illustrates a vehicle.

FIG. 1 schematically illustrates a vehicle 100. The vehicle 100 includes an energy storage device 102 (e.g., a vehicle battery) and a power regulating device 104 (e.g., a vehicle battery charger). When an electrical connection 107 is established between the power regulating device 104 and the energy storage device 102, the power regulating device 104 supplies power to the energy storage device 102 or, in some embodiments, supplies power from the energy storage device 102 to one or more components included in the vehicle 100. A disconnect mechanism 108, such as a switch, can be used to establish or terminate the electrical connection 107.

As illustrated in FIG. 1, the vehicle 100 also includes a plurality of sensors 109. In one embodiment, each of the plurality of sensors 109 includes an acceleration sensor. Each acceleration sensor can be configured to detect acceleration of the vehicle 100 in one or more directions. For example, in some embodiments, each acceleration sensor detects acceleration of the vehicle 100 in at least two directions (e.g., longitudinal or x-axis acceleration and lateral or y-axis acceleration). In some embodiments, the plurality of sensors 109 (or a set thereof) are part of an impact detection system and represent a plurality of peripheral acceleration sensors ("PAS"). Accordingly, in some embodiments, data from the plurality of sensors 109 are referred to as "vehicle crash signals." Also, in some embodiments, each of the plurality of sensors 109 is mounted on one of a plurality of pillars included in the vehicle 100 (e.g., a B-Pillar 110, a C-Pillar 112, and a D-pillar 114, as seen in FIG. 1). For example, FIG. 1 illustrates one example of a configuration of the plurality of sensors 109 installed in the vehicle 100.

Figure 2:
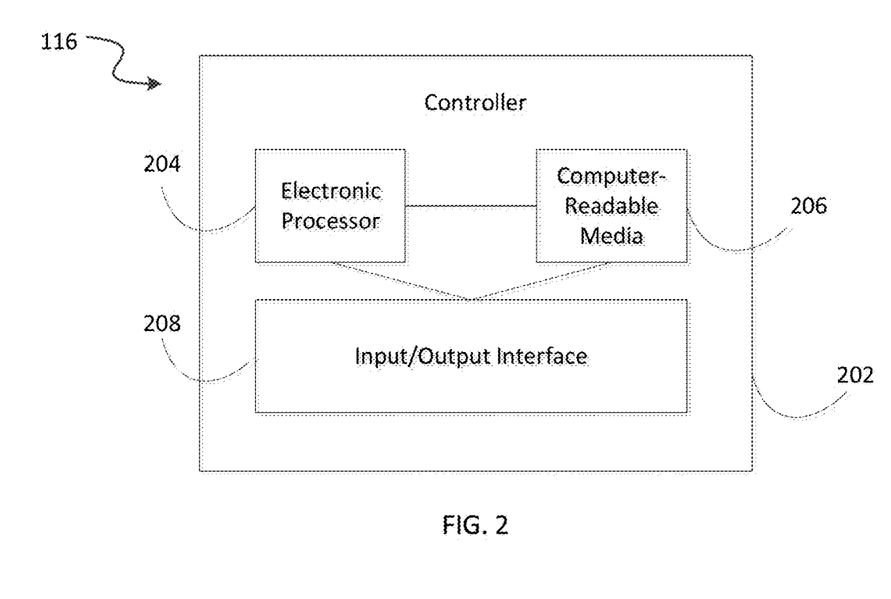
FIG. 2 schematically illustrates a controller included in the vehicle of FIG. 1.

The vehicle 100 also includes a controller 116. As illustrated in FIG. 2, the controller 116 includes an electronic processor 204, non-transitory computer-readable medium 206, and an input/output interface 208. It should be understood that the controller 116 can also include additional components. Also, the controller 116 can be configured to perform additional functionality than the functionality described above. In addition, the functionality performed by the controller 116 as described below can be distributed among multiple controllers.

The computer-readable medium 206 (e.g., read-only memory, random-access memory, or combinations thereof) stores instructions and data. The electronic processor 204 retrieves instructions from the computer-readable medium 206 and executes the instructions to perform a set of functions including the methods described herein.

The input/output interface 208 allows the controller 116 to receive data and transmit data external to the controller 116. For example, the input/output interface 208 can communicate with one or more external devices over one or more wired or wireless connections (e.g., a controller area network ("CAN")). In particular, as illustrated in FIG. 2, the controller 116 communicates with a plurality of sensors 109 included in the vehicle 100 through the input/output interface 208. In some embodiments, the controller 116 communicates with the one or more of the plurality of sensors 109 over a CAN bus 118. However, in other embodiments, the controller 116 communicates with one or more of the plurality of sensors 109 over a direct connection. It should be understood that the controller 116 can communicate with the plurality of sensors 109 using wired or wireless communication. Also, in some embodiments, one or more of the plurality of sensors 109 are included in the controller 116. In addition, in some embodiments, one or more of the plurality of sensors 109 are included in another controller included in the vehicle 100, which communicates with the controller 116 (e.g., over the CAN bus 118).

Figure 3:
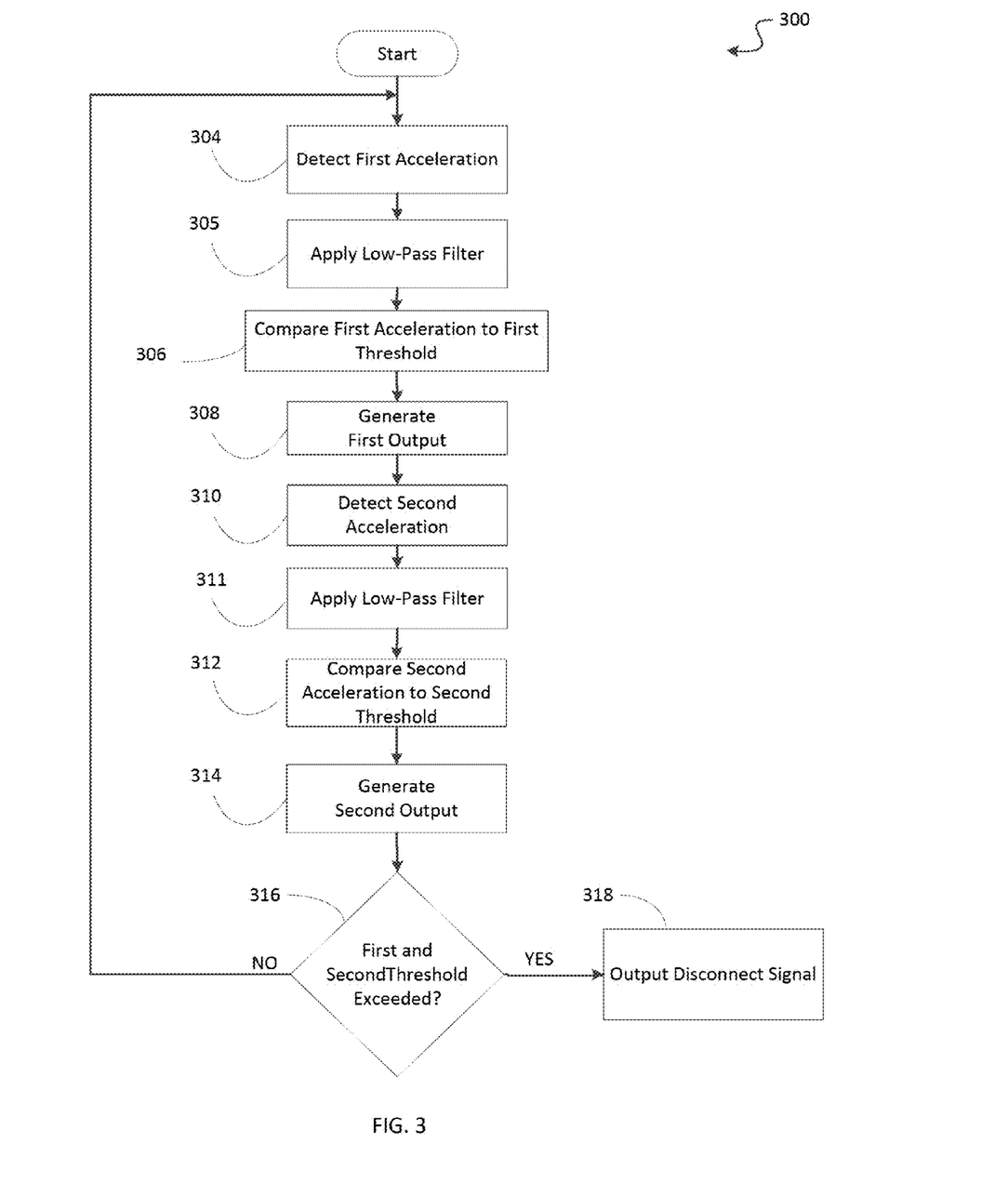
FIG. 3 is a flow chart illustrating a method performed by the controller of FIG. 2.

As noted above, the electronic processor 204 executes instructions stored in the computer-readable medium 202 to perform various methods. In particular, the electronic processor 204 executes instructions stored in the computer-readable medium 202 to manage the electrical connection 107 between the power regulating device 104 and the energy storage device 102. For example, FIG. 3 illustrates a method 300 performed by the electronic processor 204 to manage the electrical connection 107. As illustrated in FIG. 3, the method 300 includes detecting a first acceleration of the vehicle 100 based on data from the plurality of sensors 109 (at block 304) and comparing (after optionally applying a low-pass filter to the first acceleration (at block 305)) the first acceleration of the vehicle 100 to a first threshold (at block 306). The electronic processor 204 generates a first output representing whether the first acceleration of the vehicle 100 exceeds the first threshold (at block 308).

As illustrated in FIG. 3, the method 300 also includes detecting a second acceleration of the vehicle 100 based on data from the plurality of sensors 109 (at block 310), comparing (after optionally applying a low-pass filter to the second acceleration (at block 311)) the second acceleration to a second threshold (at block 312), and generating a second output representing whether the second acceleration of the vehicle 100 exceeds the second threshold (at block 314). When, based on the first and second output, the electronic processor 204 determines that first acceleration of the vehicle 100 did not exceed the associated first threshold or the second acceleration of the vehicle 100 did not exceed the associated second threshold (at block 316), the electronic processor 204 does not take any action with respect to the electrical connection 107. However, in some embodiments, the electronic processor 204 outputs a signal (e.g., generates or sets a flag) indicating that the electrical connection 107 should be maintained.

However, when, based on the first and second outputs, the electronic processor 204 determines that the first acceleration of the vehicle 100 exceeds the associated first threshold and the second acceleration of the vehicle 100 exceeds the associated second threshold (at block 316), the electronic processor outputs a disconnect signal (at block 318). The disconnect signal initiates termination of the electrical connection 107 between the power regulating device 104 and the energy storage device 102. For example, the disconnect signal can be received by the disconnect mechanism (or a controller associated therewith) and, in response to receiving the disconnect signal, the disconnect mechanism can be controlled (e.g., opened, closed, or changed position) to terminate the electrical connection 107. In some embodiments, the electronic processor 204 outputs the disconnect signal by generating or setting a flag (e.g., accessible by another vehicle controller).

Accordingly, as illustrated in FIG. 3, the electronic processor 204 compares vehicle accelerations (e.g., the same or different vehicle accelerations) to two thresholds (e.g., the same or different thresholds). When both accelerations exceed both thresholds, the electronic processor 204 terminates the electrical connection 107 between the power regulating device 104 and the energy storage device 102. Using the two thresholds ensures that termination of the electrical connection 107 is warranted. For example, one threshold can be considered a "decision" threshold that represents a minimum acceleration associated with particular vehicle impact. The other threshold can be considered a "plausibility" threshold that checks for a minimum acceleration (e.g., a different acceleration) to confirm the existence (e.g., the plausibility) of any vehicle impact detected through the "decision" threshold. In particular, vehicle impacts affect vehicle acceleration in different directions and at different locations on a vehicle. Accordingly, comparing two thresholds to two different vehicle accelerations (e.g., different acceleration directions or different acceleration locations) aids the electronic processor 204 in correctly identifying the occurrence of particular types of vehicle impacts.

The accelerations and thresholds applied by the electronic processor 204 can vary based on the type of vehicle impact being detected. For example, in some embodiments, the electronic processor 204 can be configured to apply one or more functionality paths, where each functionality path uses particular accelerations and particular thresholds. For example, in one functionality path (illustrated in FIG. 4A), the first acceleration (detected at block 304) is a longitudinal acceleration associated with the D-pillar of the vehicle 100 ($A_{x,\ D\text{-}Pillar}$) and the second acceleration (detected at block 310) is a lateral acceleration associated with the D-pillar of the vehicle 100 ($A_{y,\ D\text{-}Pillar}$). In this functionality path, the thresholds applied to the first acceleration and the second acceleration can be the same or can be different and can be set based on characteristics of the vehicle 100. In some embodiments, the electronic processor 204 uses the functionality path illustrated in FIG. 4A to detect left-hand side impact 430 or a rear impact 432 as illustrated in FIG. 4B.

In another functionality path (illustrated in FIG. 5A), the first acceleration (detected at block 304) is a longitudinal acceleration associated with the D-Pillar D of the vehicle 100 ($A_{x,\ D\text{-}Pillar}$) and the second acceleration (detected at block 310) is longitudinal acceleration associated with an electronic control unit ("ECU") included in the vehicle 100 ($A_{x,\ ECU}$). In some embodiments, the ECU is centrally located in the vehicle 100 as compared to being associated with a vehicle pillar. In some embodiments, the ECU is the controller 116. In this functionality path, the thresholds applied to the first acceleration and the second acceleration can be the same or can be different and can be set based on characteristics of the vehicle 100. In some embodiments, the electronic processor 204 uses the functionality path illustrated in FIG. 5A to detect rear impact 530 as illustrated in FIG. 5B.

In yet another functionality path (illustrated in FIG. 6A), the first acceleration (detected at block 304) is a lateral acceleration associated with the D-pillar D of the vehicle 100 ($A_{y,\ D\text{-}Pillar}$), and the second acceleration (detected at block 310) is a lateral acceleration associated with a left-hand B-pillar ($A_{y,\ LH\ B\text{-}Pillar}$) or C-pillar of the vehicle 100 ($A_{y,\ LH\ C\text{-}Pillar}$). Again, in this functionality path, the thresholds applied to the first acceleration and the second acceleration can be the same or can be different and can be set based on characteristics of the vehicle 100. Also, in some embodiments, the electronic processor 204 uses the functionality path illustrated in FIG. 6A to detect left-hand side impact 630 as illustrated in FIG. 6B.

Figure 4A:
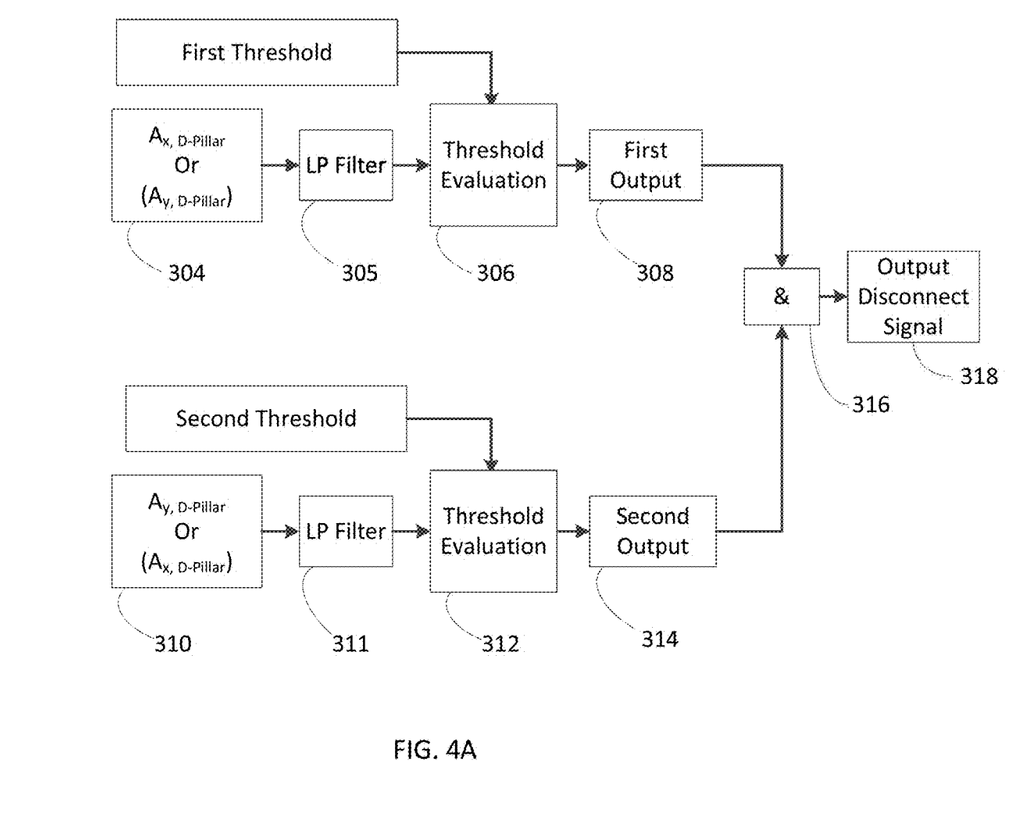
FIG. 4A schematically illustrates a functionality path performed as part of the method of FIG. 3 in one embodiment of the invention.
Figure 4B:
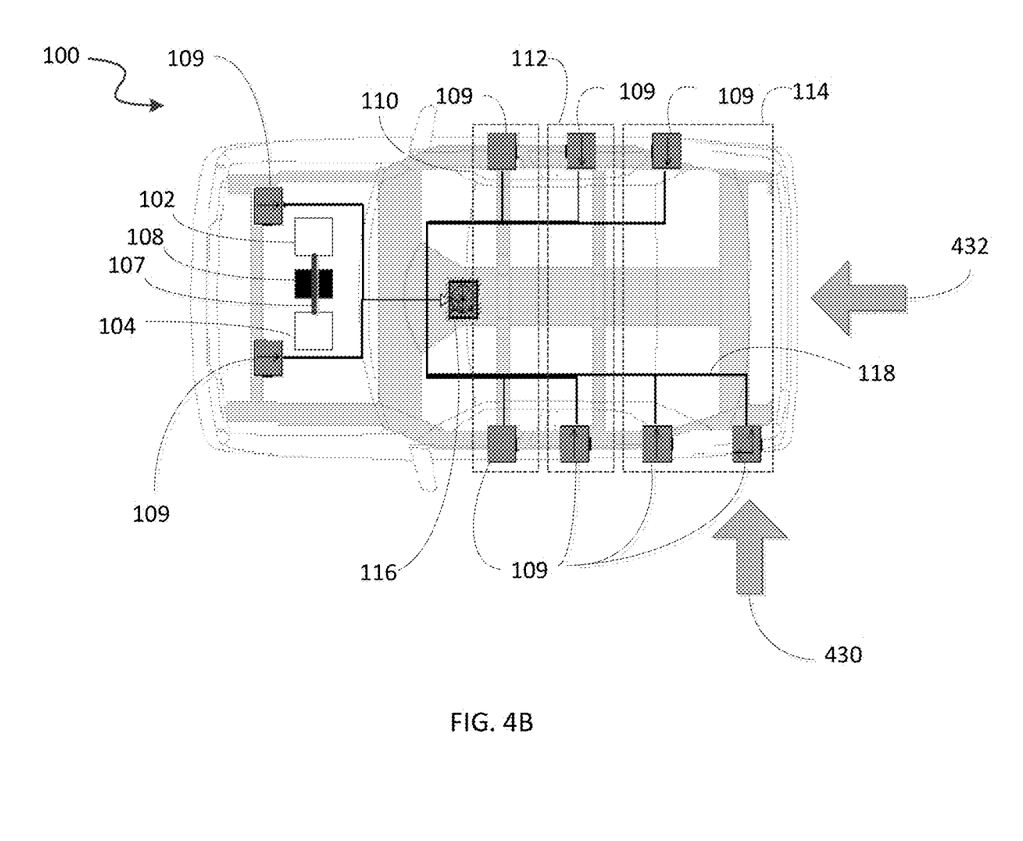
FIG. 4B schematically illustrates vehicle impact associated with the functionality path of FIG. 4A.
Figure 5A:
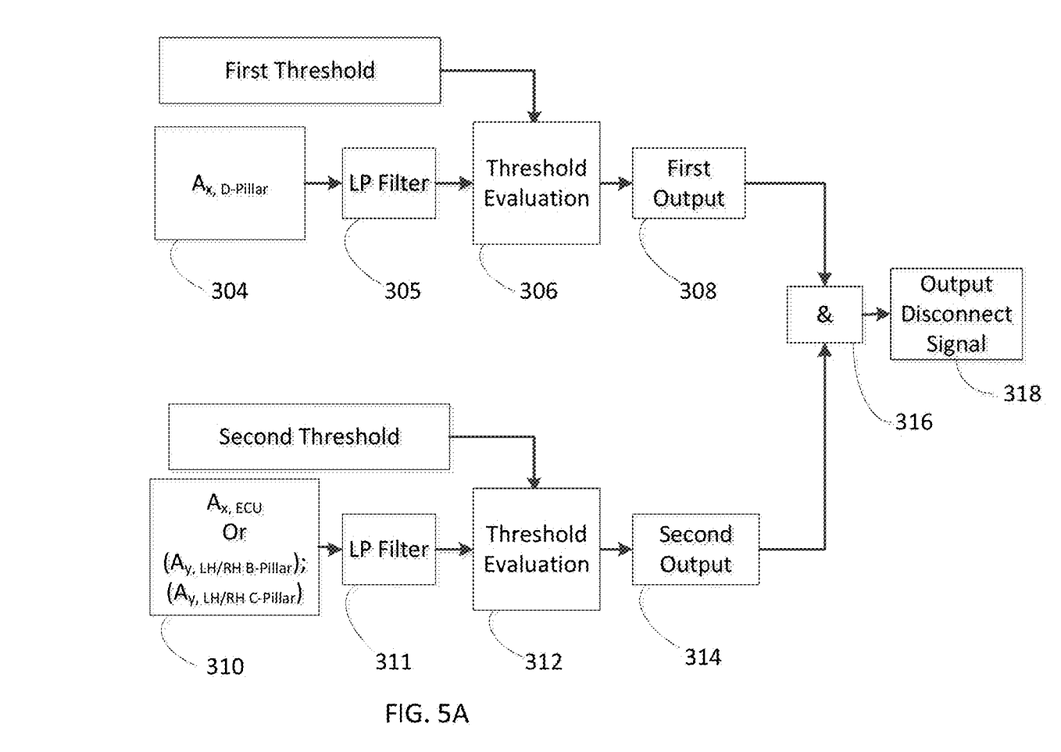
FIG. 5A schematically illustrates a functionality path performed as part of the method of FIG. 3 in another embodiment of the invention.
Figure 5B:
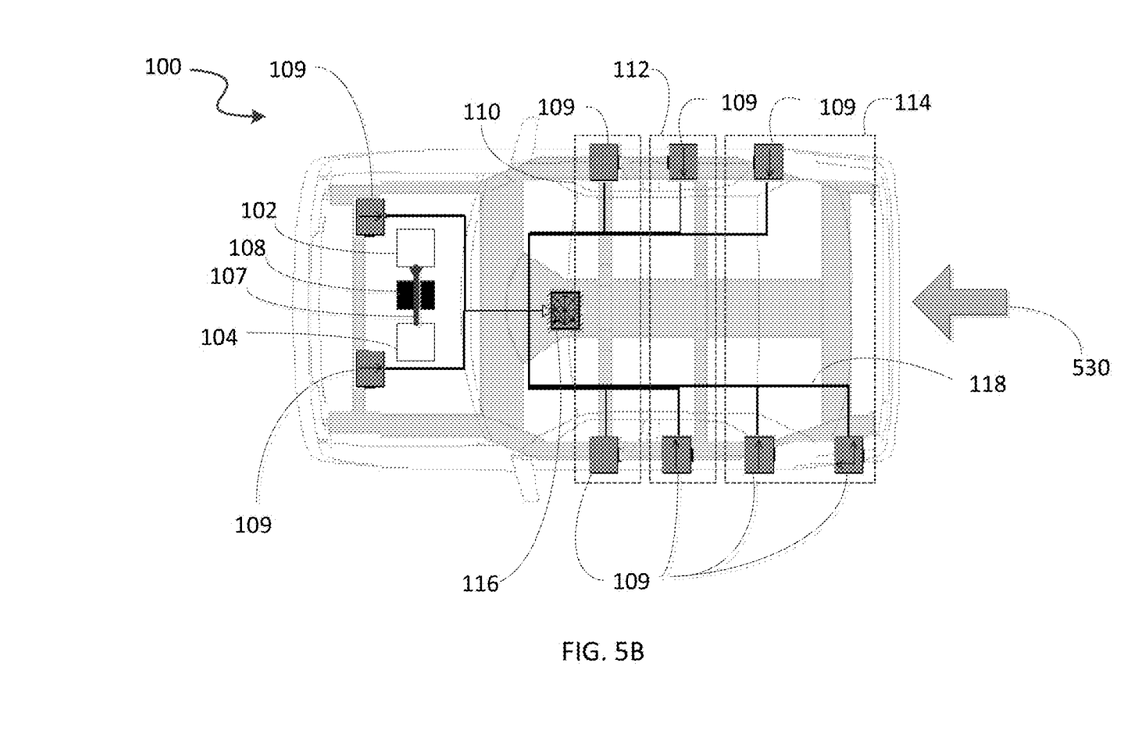
FIG. 5B schematically illustrates vehicle impact associated with the functionality path of FIG. 5A.
Figure 6A:
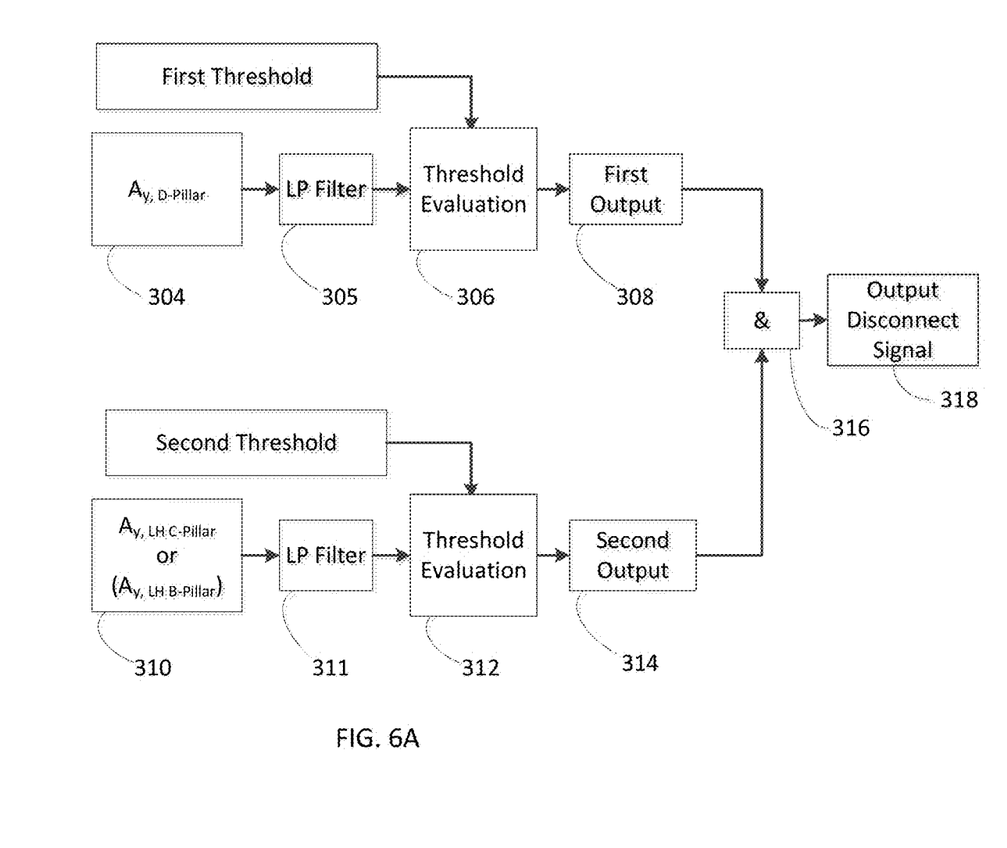
FIG. 6A schematically illustrates a functionality path performed as part of the method of FIG. 3 in yet another embodiment of the invention.
Figure 6B:
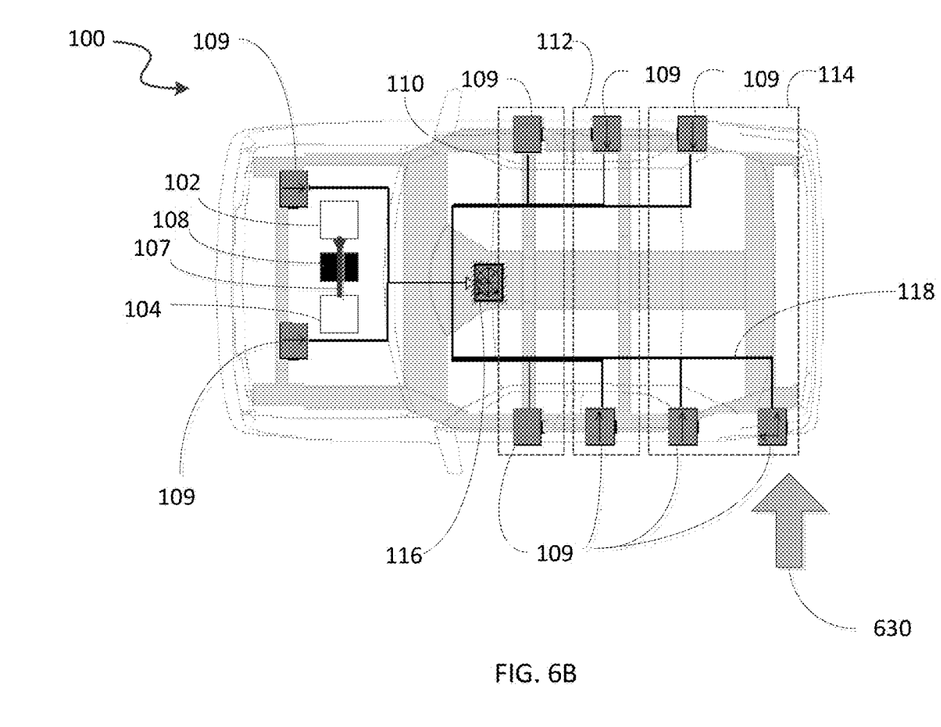
FIG. 6B schematically illustrates vehicle impact associated with the functionality path of FIG. 6A.

It should be understood that the functionality paths illustrated in FIGS. 4A, 5A, and 6A represent example functionality paths and other paths with other accelerations and thresholds are also possible. Also, in some embodiments, a particular functionality path performed by the electronic processor 204 can include more than two threshold evaluations. Furthermore, it should be understood that the electronic processor 204 can be configured to perform a subset of or all of the functionality paths illustrated in FIGS. 4A, 5A, and 6A. In addition, in some embodiments, the electronic processor 204 performs one or more of the functionality paths at predetermined intervals (e.g., in a predetermined sequence) or in response to particular triggering events (e.g., air bag deployment). Also, as noted above, the thresholds used in each evaluation can vary based on vehicle characteristics and other static and dynamic variables (e.g., vehicle speed, weather conditions, road conditions, etc.).

Various features and advantages of the invention are set forth in the following claims.

What is claimed is:

1. A system for managing an electrical connection between a power regulating device included in a vehicle and an energy storage device included in the vehicle, the system comprising:
   an electronic processor configured to
      compare a first acceleration of the vehicle to a first threshold and generate a first output representing whether the first acceleration of the vehicle exceeds the first threshold,
      compare a second acceleration of the vehicle to a second threshold and generate a second output representing whether the second acceleration of the vehicle exceeds the second threshold, and
      output a signal to disconnect the power regulating device from at least one energy storage device included in the vehicle when the first output represents that the first acceleration of the vehicle exceeds the first threshold and the second output represents that the second acceleration of the vehicle exceeds the second threshold, the signal terminating the electrical connection between the power regulating device and the energy storage device, wherein the first threshold and the second threshold vary depending on a type of vehicle impact detected, wherein the type of vehicle impact detected includes at least one selected from a group consisting of a front impact, a left-hand side impact, a right-hand side impact, and a rear impact.

2. The system of claim 1, wherein the first acceleration of the vehicle is a longitudinal acceleration of a pillar of the vehicle and the second acceleration of the vehicle is a lateral acceleration of the pillar of the vehicle.

3. The system of claim 1, wherein the first acceleration of the vehicle is a longitudinal acceleration of a pillar of the vehicle and the second acceleration of the vehicle is a longitudinal acceleration of a control unit included in the vehicle.

4. The system of claim 1, wherein the first acceleration of the vehicle is a lateral acceleration of a pillar of the vehicle and the second acceleration of the vehicle is a longitudinal acceleration of the pillar of a vehicle.

5. The system of claim 1, wherein the first acceleration of the vehicle is a lateral acceleration of a first pillar of the vehicle and the second acceleration of the vehicle is a lateral acceleration of a second pillar of the vehicle.

6. The system of claim 1, wherein the power regulating device is a battery charger and the energy storage device is a battery.

7. The system of claim 1, wherein the electronic processor is configured to detect the first acceleration based on data from an acceleration sensor configured to detect acceleration of the vehicle in at least one direction.

8. The system of claim 7, wherein the acceleration sensor is mounted on a pillar included in the vehicle.

9. The system of claim 1, wherein the electronic processor is further configured to low-pass filter the first acceleration of the vehicle before comparing the first acceleration to the first threshold and low-pass filter the second acceleration of the vehicle before comparing the second acceleration to the second threshold.

10. A method of managing an electrical connection between a power regulating device included in a vehicle and an energy storage device included in the vehicle, the method comprising:

detecting a first acceleration of the vehicle;
comparing the first acceleration of the vehicle to a first threshold;
generating a first output representing whether the first acceleration of the vehicle exceeds the first threshold;
detecting a second acceleration of the vehicle;
comparing the second acceleration of the vehicle to a second threshold;
generating a second output representing whether the second acceleration of the vehicle exceeds the second threshold; and
outputting, with an electronic processor, a signal when the first output represents that the first acceleration of the vehicle exceeds the first threshold and the second output represents that the second acceleration of the vehicle exceeds the second threshold, the signal terminating the electrical connection between the power regulating device and the energy storage device, and wherein the first threshold and the second threshold vary depending on a type of vehicle impact being detected, wherein the type of vehicle impact detected includes at least one selected from a group consisting of a front impact, a left-hand side impact, a right-hand side impact, and a rear impact.

11. The method of claim 10, wherein detecting the first acceleration of the vehicle includes detecting a longitudinal acceleration of a pillar of the vehicle and wherein detecting the second acceleration of the vehicle includes detecting a lateral acceleration of the pillar of the vehicle.

12. The method of claim 10, wherein detecting the first acceleration of the vehicle includes detecting a longitudinal acceleration of a pillar of the vehicle and wherein detecting the second acceleration of the vehicle includes detecting a longitudinal acceleration of a control unit included in the vehicle.

13. The method of claim 10, wherein detecting the first acceleration of the vehicle includes detecting a lateral acceleration of a pillar of the vehicle and wherein detecting the second acceleration of the vehicle includes detecting a longitudinal acceleration of the pillar of a vehicle.

14. The method of claim 10, wherein detecting the first acceleration of the vehicle includes detecting a lateral acceleration of a first pillar of the vehicle and wherein detecting the second acceleration of the vehicle includes detecting a lateral acceleration of a second pillar of the vehicle.

15. The method of claim 10, wherein detecting the first acceleration of the vehicle includes detecting an acceleration of a first pillar of a vehicle and wherein detecting the second acceleration includes detecting an acceleration of a second pillar of the vehicle.

16. The method of claim 10, further comprising low-pass filtering the first acceleration of the vehicle before comparing the first acceleration to the first threshold and low-pass filtering the second acceleration of the vehicle before comparing the second acceleration to the second threshold.

17. The system of claim 1, wherein the first threshold is a decision threshold that represents a minimum acceleration associated with a particular type of vehicle impact and the second threshold is a plausibility threshold that checks for a minimum acceleration to confirm the existence of any type of vehicle impact detected through the decision threshold.

18. The system of claim 1, wherein the electronic processor is configured to apply one or more functionality paths, where each functionality path uses particular accelerations and particular thresholds based on the type of vehicle impact being detected.

19. The system of claim 18, wherein the electronic processor is configured to apply one or more of the functionality paths at predetermined intervals or in response to particular triggering events.

20. The system of claim 1, wherein the first acceleration and the second acceleration are associated with different acceleration directions or different acceleration locations.

* * * * *